United States Patent
Roumeliotis

(10) Patent No.: US 9,786,015 B1
(45) Date of Patent: Oct. 10, 2017

(54) SYSTEM AND METHOD FOR FRAUD DETECTION USING AGGREGATED FINANCIAL DATA

(71) Applicant: Intuit Inc., Mountain View, CA (US)

(72) Inventor: George Roumeliotis, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 275 days.

(21) Appl. No.: 14/192,698

(22) Filed: Feb. 27, 2014

(51) Int. Cl.
*G06Q 40/00* (2012.01)

(52) U.S. Cl.
CPC .................................. *G06Q 40/12* (2013.12)

(58) Field of Classification Search
None
See application file for complete search history.

(56) References Cited

U.S. PATENT DOCUMENTS

| | | | |
|---|---|---|---|
| 2008/0191007 A1* | 8/2008 | Keay .................... | G06Q 40/02 235/379 |
| 2009/0265211 A1* | 10/2009 | May ..................... | G06Q 20/02 705/18 |
| 2011/0238564 A1* | 9/2011 | Lim .................... | G06Q 20/3223 705/38 |
| 2012/0259753 A1* | 10/2012 | Orad ..................... | G06Q 40/00 705/35 |
| 2013/0091043 A1* | 4/2013 | Leibon ................ | G06Q 20/4016 705/35 |

OTHER PUBLICATIONS

Rondeau, "Innovation in Coool" dated Jul. 18, 2011, http://www.incontextdesign.com/innovationincool/post/mint-com/ (5 pages).

* cited by examiner

*Primary Examiner* — Paul Danneman
(74) *Attorney, Agent, or Firm* — Vista IP Law Group LLP

(57) ABSTRACT

A computer-implemented method of detecting suspected financial fraudulent activity includes a computing device receiving financial data from a plurality of different financial service providers associated with a user. The computing device aggregates the received financial data for the user and analyzes the aggregated financial data for suspicious financial activity. The computing device alerts a user and at least one of the plurality of different service providers when suspicious financial activity is detected.

25 Claims, 7 Drawing Sheets

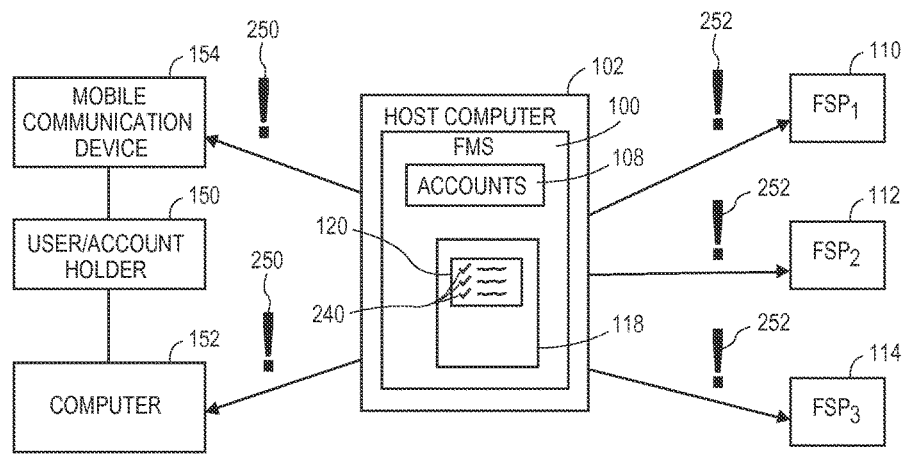
FIG. 4A
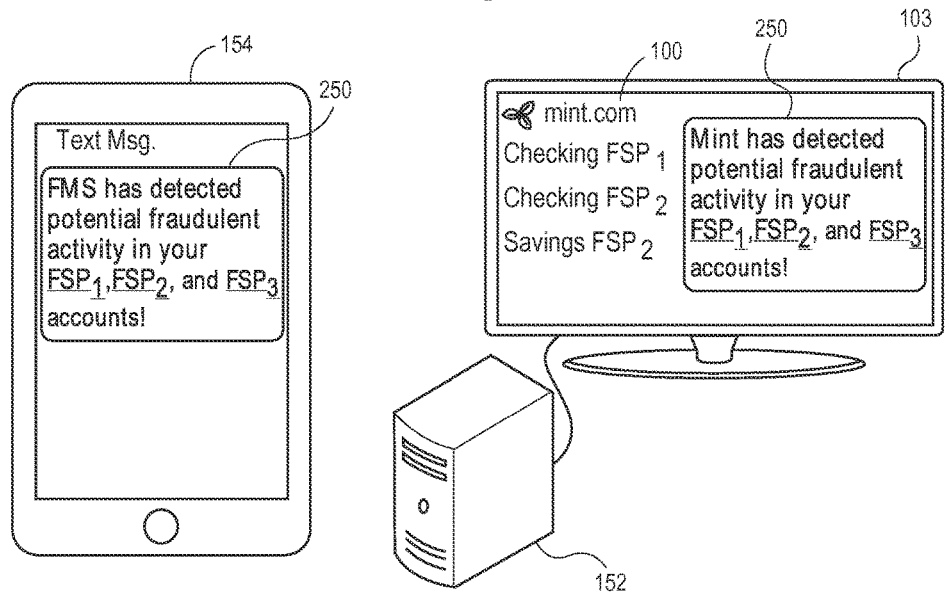
FIG. 4B
FIG. 4C

SYSTEM AND METHOD FOR FRAUD DETECTION USING AGGREGATED FINANCIAL DATA

SUMMARY

The methods and systems described herein are suitable for use in detecting or identifying suspected fraudulent financial activity. The methods and systems described herein analyze aggregated financial data tied to a particular account holder or user. Aggregated financial data includes financial data that is tied to account holder or use that originates from or passes through multiple financial services providers. The aggregated financial data is contained in a computer database. The aggregated financial data is refreshed or updated with more recent transaction data an ongoing basis. The aggregated financial data is analyzed by a fraud detection analyzer that is executed using one or more processors to identify suspected fraudulent activity based, at least in part, on transactions that have occurred or are occurring across a plurality of financial service providers.

An advantage of the current method and system is the ability to detect suspected fraudulent transactions that are not otherwise picked-up or discovered using existing fraud detection techniques. The method and system leverages financial data that is aggregated from multiple financial services providers. Transactions that occur individually with an account held at a single financial service provider may not be sufficient to trigger any alerts or warning of suspected fraudulent activity. The current system and method is able to leverage the aggregated financial data across multiple financial services providers such that suspicious activity that may be occurring across multiple accounts (but not any single account) can be identified and the user and/or financial services provider notified of the suspected nature of the transactions.

In one embodiment, a computer-implemented method of detecting suspected financial fraudulent activity includes a computing device receiving financial data from a plurality of different financial service providers associated with a user. The computing device aggregates the received financial data for the user. The computing device also analyzes the aggregated financial data for suspicious financial activity and alerts a user and at least one of the plurality of different service providers when suspicious financial activity is detected.

In another embodiment, a system for detecting suspected financial fraudulent activity includes a computing device configured to receive financial data from a plurality of different financial service providers associated with a user. The system includes a database operably connected to the computing device and configured to contain aggregated financial data for the user. A fraud detection analyzer executable by the computing device is part of the system, the fraud detection analyzer configured to analyze the aggregated financial data for suspicious financial activity. The computing device is configured to alert at least a user and at least one of the plurality of different service providers when suspicious financial activity is detected.

BRIEF DESCRIPTION OF THE DRAWINGS

FIG. 4A illustrates a notification scheme according to one embodiment.

FIG. 4B illustrates a mobile communication device receiving a notification according to one embodiment.

FIG. 4C illustrates a computer device receiving a notification according to another embodiment.

DETAILED DESCRIPTION OF ILLUSTRATED EMBODIMENTS

Figure 1A:
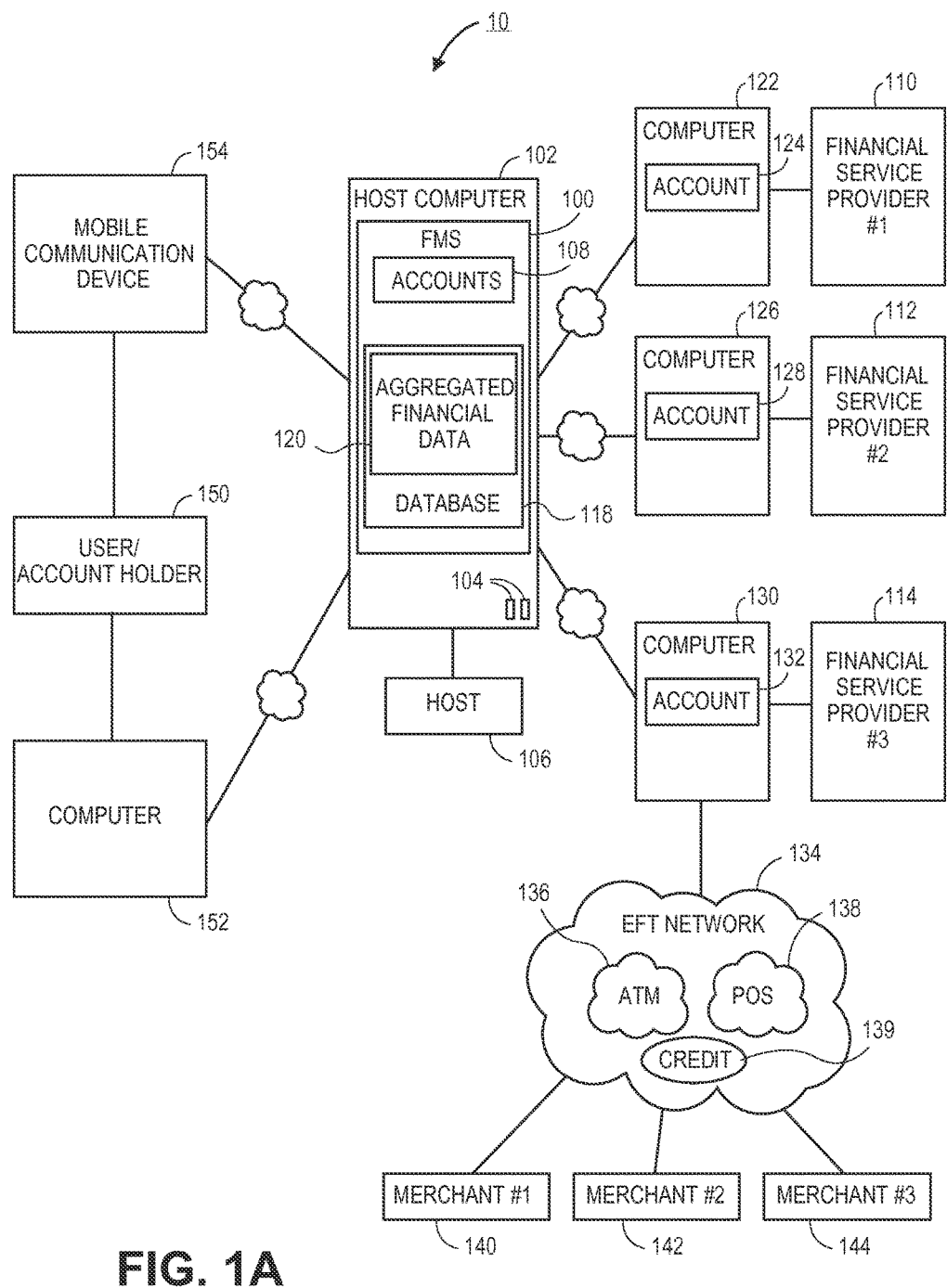
FIG. 1A schematically illustrates a system for detecting suspected fraudulent activity according to one embodiment.
Figure 1B:
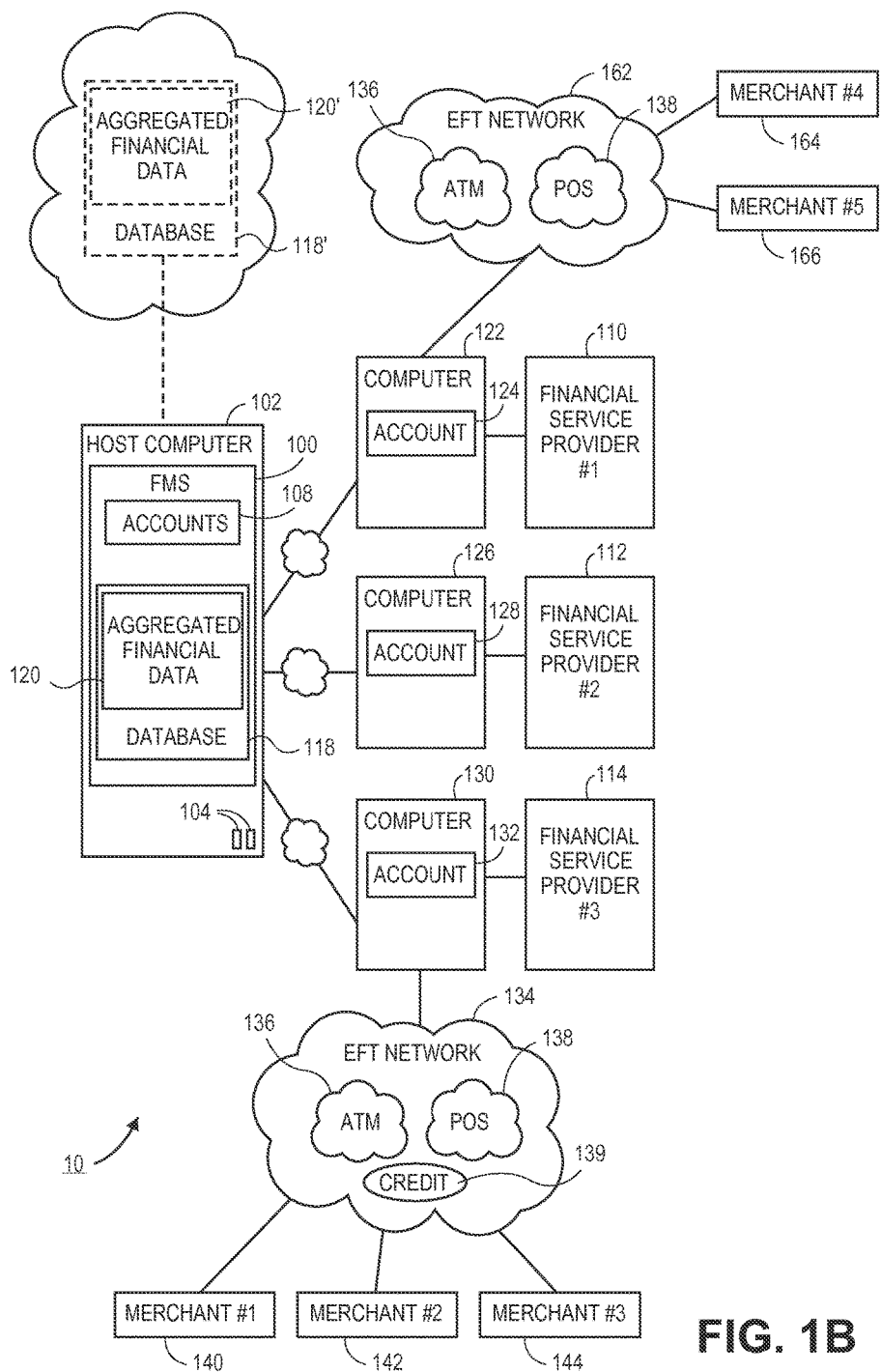
FIG. 1B schematically illustrates a system for detecting suspected fraudulent activity according to another embodiment.

FIGS. 1A and 1B illustrate the general architecture of a system 10 for detecting suspected financial fraudulent activity. Referring first to FIG. 1A, the system 10 includes a financial management system (FMS) 100. FMS 100 is a financial application or tool that is used by consumers to manage their personal financial affairs. Typically, though not exclusively, the FMS 100 permits consumers to track their personal financial activities by collecting receipts, balancing accounts (e.g., checkbook accounts), tracking and paying bills, monitoring investments, loans, and the like. Commercial examples of various FMS products include MINT, QUICKEN, QUICKBOOKS and FINANCEWORKS, financial management products or systems that are available from Intuit Inc. These types of systems allow consumers or business owners to combine, process and categorize financial data and present numerical data in various forms or summaries such as balances or values, charts, graphs and reports. MINT, QUICKEN, QUICKBOOKS and FINANCEWORKS are registered trademarks of Intuit Inc., Mountain View, Calif.

For example, the MINT financial management system allows consumers to link their MINT account to the various financial accounts at respective financial service providers so that the consumer can view aggregated checking, savings, loan, credit card, stock and data of other linked accounts in a centralized location using their computer or mobile communication device. In addition to providing a composite view of data of multiple accounts, data of linked accounts may also be categorized to provide a better understanding to the consumer regarding their finances.

Referring back to FIG. 1A, in this embodiment, the FMS 100 is operated by host computer 102. In one aspect, the host computer 102 may comprise one or more servers that are remotely accessed as described herein in further detail. The host computer 102 includes one or more processors 104 which are used execute software instructions in accordance with the methods described herein. It should be understood that the methods may be implemented by one or more dedicated processors 104 or, alternatively, software execution may be distributed across multiple processors 104. The host computer 102 may be controlled by a host 106 such as, for instance, financial services provider or financial management company such as Intuit Inc. of Mountain View, Calif., which provides or hosts financial management systems (FMS) such as MINT financial management system. In one embodiment, the FMS 100 may include the MINT program although it should be understood that the invention is not so limited.

Still referring to FIG. 1A, the host computer 102 hosts accounts 108 of a user within the FMS 100. The accounts 108 as shown in FIG. 1A, preferably includes multiple financial sub-accounts held by a plurality of different financial service providers. Typically, these accounts include banking accounts (e.g., checking, saving, and money market accounts), investment accounts (for securities, bonds, and the like), as well as credit accounts for revolving lines of credit or loans. For example, accounts 108 contained in the FMS 100 may include a checking and a savings account from a first financial service provider 120. The accounts 108 may include banking accounts as well as stock or investment accounts from a second, separate financial services provider 112. Finally, as seen in FIG. 1A, the accounts 108 may also include, for example, a credit account from a third financial services provider 114. The particular type of account 108 at any one financial services provider (sometimes referred to herein as FSP) may vary.

Still referring to FIG. 1A, a database 118 is configured to interface with the FMS 100. The database 118 contains aggregated financial data 120 from a plurality of financial service providers 110, 112, 114. In this particular example, the aggregated financial data 120 includes account balance and transaction history for the checking and savings account at the first financial service provider 110. Transaction history may include withdrawals, deposits, transfers, as well as pending transactions (e.g., pending bill pays or pending POS, debit card charges, and credit card charges). In a preferred aspect of the invention, the aggregated financial data 120 includes additional information pertaining to each transaction which transmitted and received electronically by the host computer 102 as an electronic transaction or receipt data. This additional information includes, for instance, the dollar amount of the transaction, the time of the transaction, the name and geographic location where the transaction occurred (if available), the identity of the merchant or payee. In some instances, this additional information includes additional level of details on the transaction. For example, the electronic transaction may include item level data that identifies the item(s) purchased with funds. For example, the electronic transaction data may include a description of the item(s) purchased at a particular merchant.

Still referring to FIG. 1A, the aggregated financial data 120 is obtained from electronic transaction data that is communicated to the host computer 102 via a networked link between the host computer 102 and computers associated with each financial services provider 110, 112, 114. For example, a first computer 122 associated with a user account 124 at the first financial services provider 110 is accessed by the host computer 102 to acquire electronic transaction data. Likewise, a second computer 126 associated with a user account 128 at the second financial services provider 112 is accessed by the host computer 102 to acquire electronic transaction data. In the same manner, a third computer 130 associated with a user account 132 at the third financial services provider 114 is accessed by the host computer 102 to acquire electronic transaction data. The connection between the host computer 102 and the first computer 122 is preferably made, at least temporarily, over a wide area network such as the Internet or a local area network.

The connection between the host computer 102 and the various computers 122, 126, 130 may be accomplished automatically by the FMS 100. For example, the FMS 100 may have a pre-set schedule whereby the FMS 100 queries each computer 122, 126, 130 for recent transaction activity. For instance, once per day the FMS 100 may prompt the host computer 102 to check for recent electronic transaction data that has not already been downloaded or otherwise transferred to the host computer 102. This operation preferably takes place in the background and does not require user input. More frequent querying of the computers 122, 126, 130 is also possible (e.g., once per hour). The more frequent that the queries are conduct increases the speed at which fraudulent activity may be identified. For example, a user may save his or her account login and password information for each financial services provider in the FMS 100. The FMS 100 can then periodically log into each computer 122, 128, 130 whereby the electronic transaction data is obtained. The host computer 102 may invoke a script or other sequence of events to acquire the electronic transaction data. This includes, for example, techniques used for web scraping, screen scraping, and retrieval by running an API.

In another embodiment or aspect, the connection between the host computer 102 and the various computers 122, 126, 130 may be accomplished manually by a user using the FMS 100. For example, the FMS 100 may include an option of downloading electronic transaction data from one or more financial service providers 110, 112, 114. In this manner, one does not have to wait until the scheduled or pre-set time arrives to download electronic transaction data from the financial service providers 110, 112, 114. Manual querying or downloading can be done in conjunction with an automatic schedule.

In another embodiment or aspect, the connection between the host computer 102 and the various computers 122, 126, 130 may occur as transactions are posted or otherwise occurring at the financial service providers 110, 112, 114. In this embodiment, the respective computers 122, 126, 130 may originate contact with the host computer 102 letting the host computer 102 know that electronic transaction data is available for downloading. A connection between the host computer 102 and one or more of the computers 122, 126, 130 can be made to download any electronic transaction data. This embodiment has the advantage that the database 118 is updated substantially in real time as transactions occur.

FIG. 1A illustrates a computer 130 associated with a financial services provider 114 that is connected to an electronic funds transfer (EFT) network 134. The EFT network 134 may process a number of different types of transactions including ATM 136 transactions, point-of-sale (POS) transactions 138, and credit transactions 139. While FIG. 1A illustrates the same computer 130 that interfaces with the host computer 102 also interfacing with the EFT network 134 it should be understood that a different computer or multiple different computers may link a particular financial services provider 114 to the EFT network 134. Further, any single financial service provider 114 may be linked to multiple different EFT networks 134. Often, different EFT networks 134 offer regional coverage over a particular geographical region.

As seen in FIG. 1A, a plurality of different merchants 140, 142, 144 are connected to the EFT network 134. FIG. 1A illustrates a first merchant 140, a second merchant 142, and a third merchant 144, although it should be understood that many more merchants are typically linked to a particular EFT network 134. A customer may make a purchase at a merchant 140, 142, 144 using, for example, his or her debit cart using a terminal that swipes cards (e.g., ATM, debit, and credit cards). In some instances a swipe card is not needed. For example, the transaction may be accomplished using a mobile communication device 154 having appropriate software or applications loaded therein. The transaction is processed between the merchant 140, 142, 144 and the financial services provider 114 using the EFT network 134.

In the embodiment of FIG. 1A, a user or account holder 150 accesses the FMS 100 through a computer 152 (such as a laptop, desktop computer) or a mobile communication device 154 (such as a tablet computing device or a smartphone or PDA). The user 150 may access the FMS 100 using, for example, a browser or other interface that operations on the computer 152 or mobile communication device 154. An alternative to using a browser may include a downloadable application or "app" that is executed on the mobile communication device 154 or even the computer 152. Typically, the user or account holder 150 will need to provide a user name or ID as well as a password to access the FMS 100. It should be understood that account holder 150 or even user may not necessarily refer to a single individual. Often, an account holder 150 includes multiple people (e.g., husband and wife) who decide to household or combine accounts.

FIG. 1B illustrates an alternative embodiment of the system 10 with similar or common aspects numbered using the same reference numerals of FIG. 1A. In this alternative embodiment, the FMS 100 is run on a dedicated computer 160 as opposed to being run on a host computer 102 as illustrated in FIG. 1A. For example, the computer 160 may include a desktop, laptop, or other portable computing device with the FMS 100 contained or otherwise hosted directly on the computer 160. An example of such an FMS 100 is QUICKEN. In one embodiment, the database 118 along with the aggregated financial data 120 is contained or closely associated with the computer 160. Alternatively, as illustrated in FIG. 1B, the database 118' and aggregated financial data 120' are located remotely away from the computer 160. The FMS 100 may access the aggregated financial data 120' in this configuration using, for example, a network connection (e.g., Internet connection) between the computer 160 and the database 118'. This "cloud" based solution may also be used for backup purposes.

FIG. 1B also illustrates another EFT network 162 that is associated with financial services provider 110 via computer 122. The EFT network 162 may process a number of different types of transactions including ATM 136 transactions, point-of-sale (POS) transactions 138, and credit transactions 139. Again, while FIG. 1B illustrates the same computer 122 that interfaces with the computer 160 also interfacing with the EFT network 162 it should be understood that a different computer or multiple different computers may link a particular financial services provider 110 to the EFT network 162. FIG. 1B illustrates merchants 164, 166 that interface with EFT network 162. A customer may make a purchase at a merchant 164, 166 using an ATM, debit card, or credit card using terminal or other computing device configured to process transactions. The transaction is processed between the merchants 164, 166 and the financial services provider 110 using the EFT network 162.

Figure 1C:
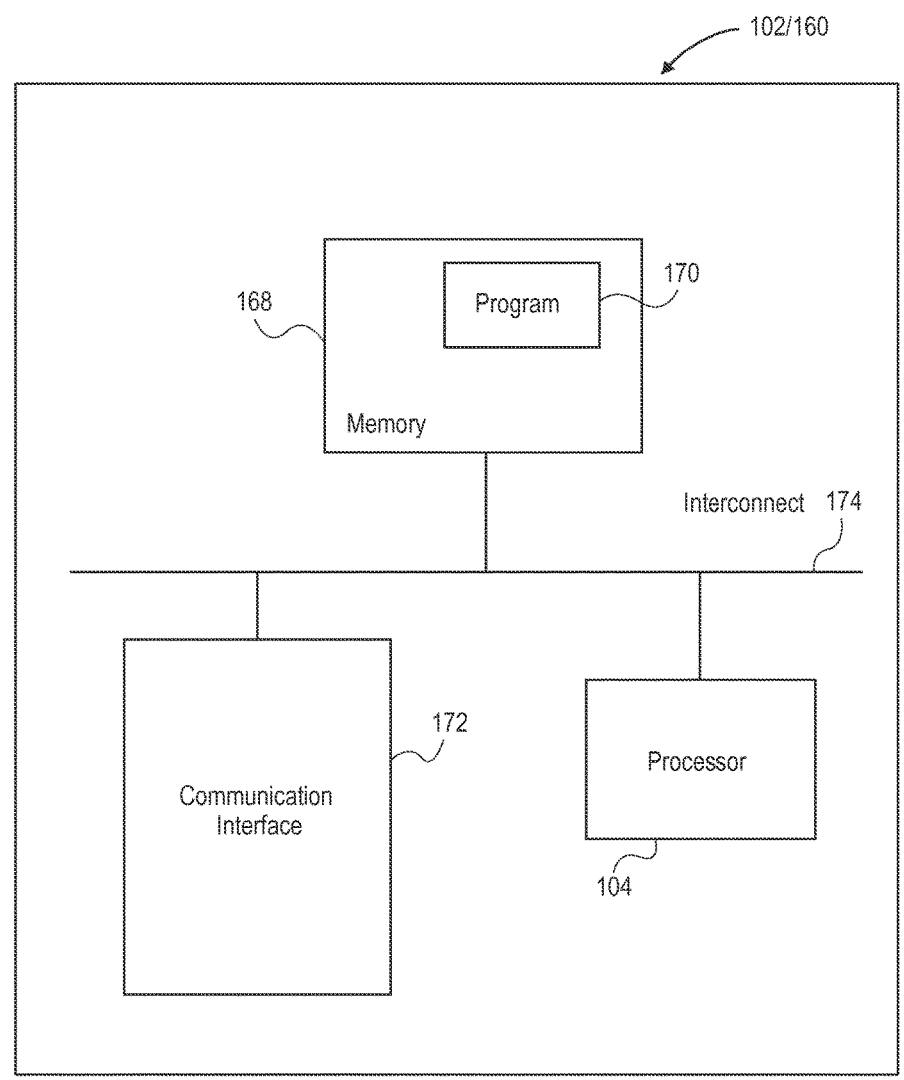
FIG. 1C generally illustrates components of a computing device such as host computer or other computer that may be utilized to execute the FMS.

FIG. 1C generally illustrates components of a computing device such as host computer 102 or computer 160 that may be utilized to execute the FMS 100 and that includes a memory 168, program instructions 170, a processor or controller 104 to execute program instructions 170, a network or communications interface 172, e.g., for communications with a network or interconnect 174 between such components. The memory 168 may be or include one or more of cache, RAM, ROM, SRAM, DRAM, RDRAM, EEPROM and other types of volatile or non-volatile memory capable of storing data. The processor unit 104 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 174 may include a system bus, LDT, PCI, ISA, or other types of buses, and the communications or network interface may, for example, be an Ethernet interface, a Frame Relay interface, or other interface. The interface 172 may be configured to enable a system component to communicate with other system components across a network which may be a wireless or various other networks. It should be noted that one or more components of computing device may be located remotely and accessed via a network. Accordingly, the system configuration illustrated in FIG. 1C is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 104 performs steps or executes program instructions 170 within memory 168 and/or embodied on the carrier to implement method embodiments.

Figure 2:
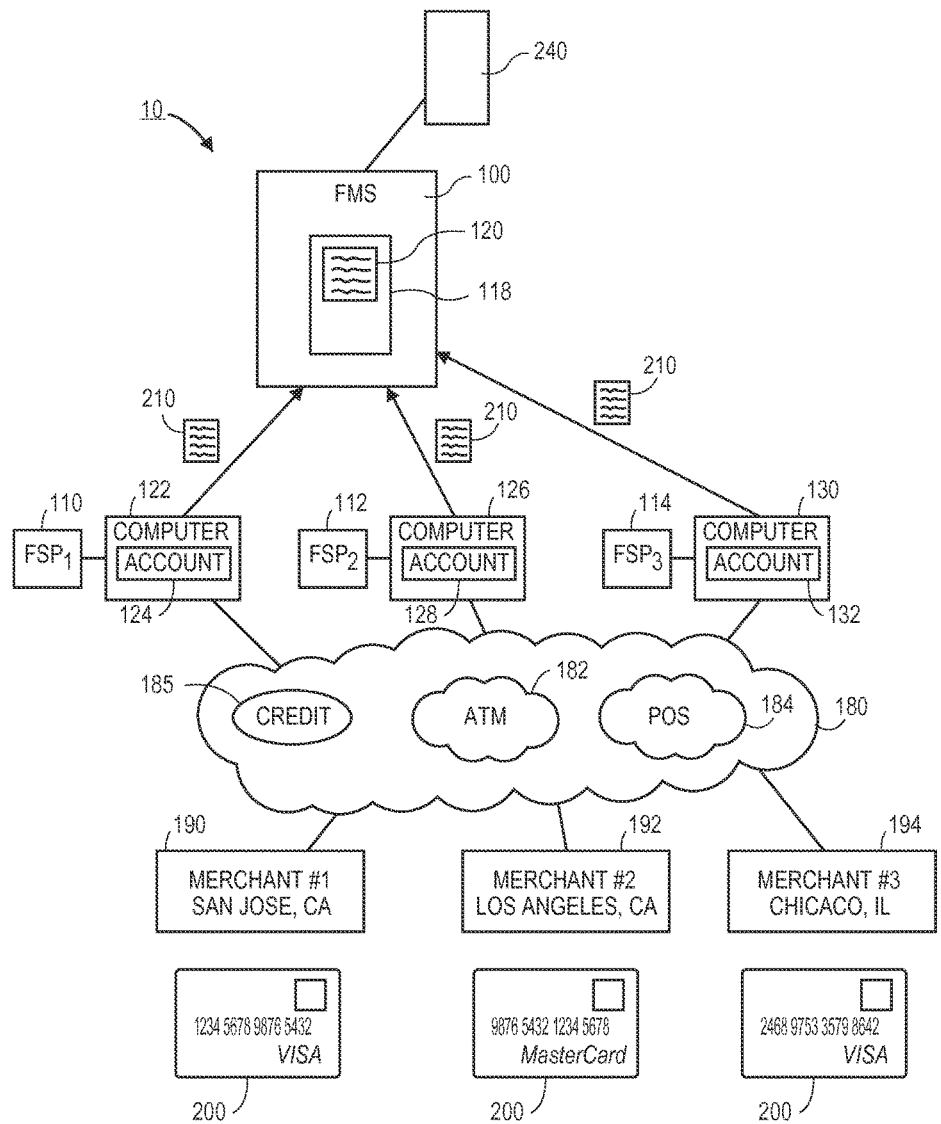
FIG. 2 schematically illustrates a system for detecting suspected fraudulent activity according to another embodiment.

FIG. 2 illustrates of how the system may be used to detect fraud using aggregated financial data according to one embodiment. In this particular example, the FMS 100 is connected to a plurality of different financial service providers 110, 112, 114 via respective computers 122, 126, 130 as described above in the context of the embodiments of FIGS. 1A and 1B. Each computer 122, 126, 130 is connected to an EFT network 180 which may have ATM transactions 182, POS transactions 184, and credit transactions 185. In this particular example, the EFT Network 180 is also connected to three different merchants 190, 192, 194. The first merchant 190 is an electronics store located in San Jose, Calif. The second merchant 192 is also an electronics retailer located in Los Angeles, Calif. The third merchant 194 is a gas station in Chicago, Ill. In this particular example, a transaction card 200 that was issued by the first financial service provider 110 was used at the first merchant 190 on December 4$^{th}$ at 1:15 PM to purchase a television set for $1,215.00. Transaction card is meant to encompass a variety of different cards used for payment. These include, ATM cards, debit cards, EBT cards, credit cards, gift cards, and the like. During or after the completion of the transaction at the first merchant 190 financial transaction data is transmitted in the form of an electronic communication to the computer 122 associated with the first financial service provider 110 via the ETF network 180.

The computer 122 associated with the first financial service provider 110 may have software contained thereon or operated thereby to perform fraud detection functionality as to transactions that are occurring on the account associated with the transaction card 200. In this example, however, a single purchase of a large value item like a television is not sufficient to flag or otherwise identify this transaction as a suspected fraudulent transaction. Accordingly, in this example, the transaction is processed by the first financial service provider 110.

Still referring to FIG. 2, a transaction card 202 that was issued by the second financial service provider 112 was used at the second merchant 192 on December 4$^{th}$ at 1:30 PM to purchase a television set for $890.00. Again, during or after the completion of the transaction at the second merchant 192 financial transaction data is transmitted in the form of an electronic communication to the computer 126 associated with the second financial service provider 112 via the ETF network 180.

The computer 126 associated with the second financial service provider 112 may also have software contained thereon or operated thereby to perform fraud detection functionality as to transactions that are occurring on the account associated with the transaction card 202. Of course, the fraud detection software is limited to activities occurring within the account 128 associated with the transaction card 202. If there is any fraud software analyzing transactions taking place on the transaction card 202, this fraud software has no idea that a separate transaction card 200 associated with the same account holder at a different financial service provider 110 was just used to purchase a television five minutes earlier in an entirely different geographical area (Southern California vs. Northern California). In this example, however, the single purchase of a large value item like a television is not sufficient for fraud software running on the computer 126 to flag or otherwise identify this transaction as a suspected fraudulent transaction. Accordingly, in this example, the transaction is processed by the second financial service provider 112.

Still referencing FIG. 2, a transaction card 204 that was issued by the third financial service provider 114 was used at the third merchant 194 on December 4$^{th}$ at 1:35 PM to withdraw $300 cash (the daily limit) from an ATM machine. Again, during or after the completion of the transaction at the third merchant 194 financial transaction data is transmitted in the form of an electronic communication to the computer 130 associated with the third financial service provider 114 via the ETF network 180.

The computer 130 associated with the third financial service provider 114 may also have software contained thereon or operated thereby to perform fraud detection functionality as to transactions that are occurring on the account associated with the transaction card 204. Again, the fraud detection software is limited to activities occurring within the account 132 associated with the transaction card 204 that was provided by the third financial service provider. If there is any fraud software analyzing transactions taking place on the transaction card 204, this fraud software has no idea that separate transaction cards 200, 202 associated with the same account holder at a different financial service providers 110, 112 was just used to purchase two televisions several minutes earlier in an entirely different state. In this example, however, the single ATM withdrawal is not sufficient for fraud software running on the computer 130 to flag or otherwise identify this transaction as a suspected fraudulent transaction. Accordingly, in this example, the transaction is processed by the third financial service provider 114 and $300 of cash is dispensed.

Figure 3:
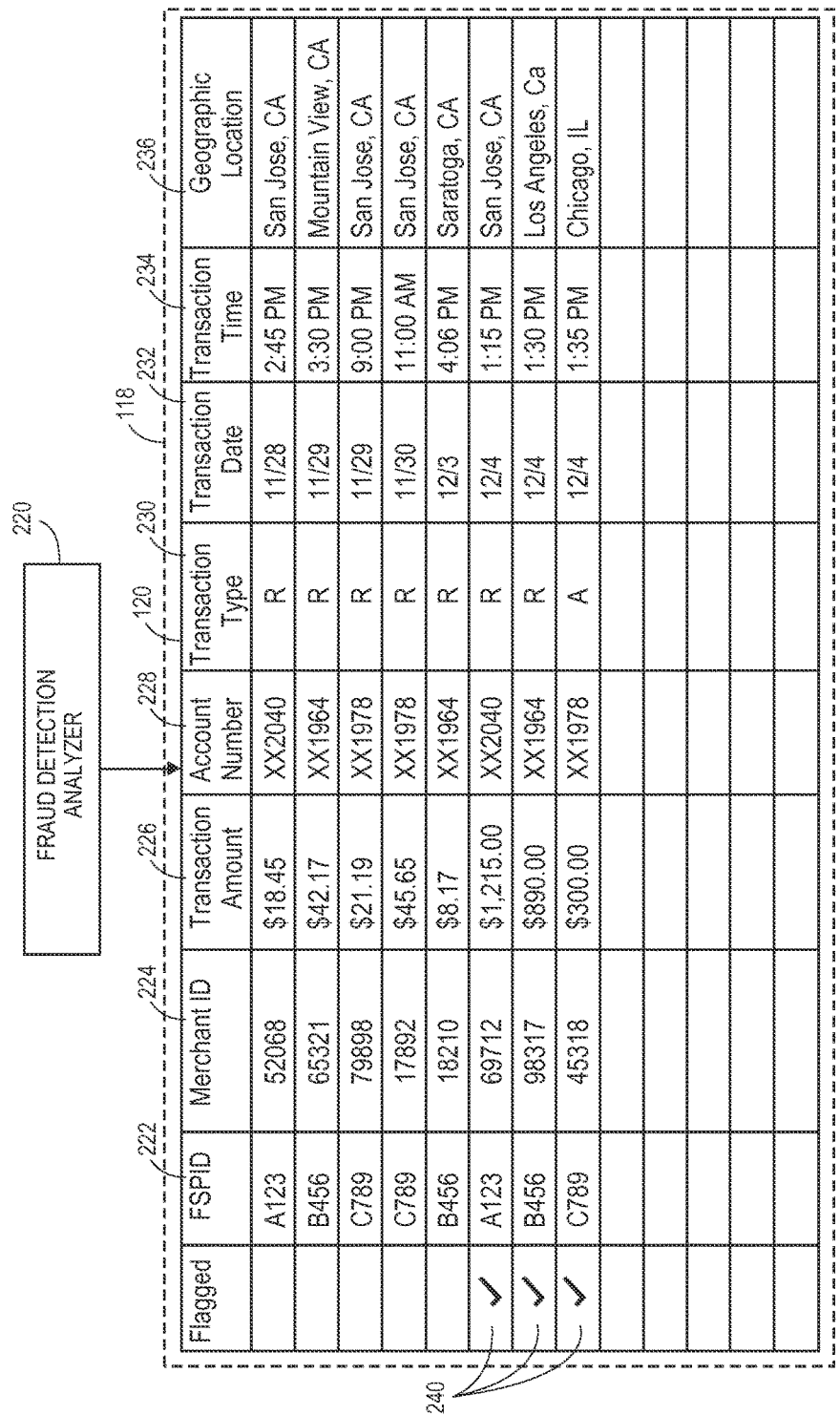
FIG. 3 illustrates an example of money-out transactions contained in aggregated financial data contained within a database. The fraud detection analyzer operates on the aggregated financial data to detect suspected fraudulent transactions.

Still referring to FIG. 2, the system 10 and methods described herein, however, are able to identify these financial transactions as suspected fraudulent activity by aggregating financial data across multiple financial service providers. With reference to FIGS. 2 and 3, financial transaction data 210 is transferred from each respective computer 122, 126, 130 to the database 118. The financial transaction data 210 is then stored as aggregated financial data 120 within the database. As explained herein, the financial transaction data 210 may be received by the database 118 using a host computer 102 or other computer 160. The financial transaction data 210 may be retrieved periodically, for example, daily from each computer 122, 126, 130. Alternatively, the financial transaction data 210 may be acquired by the database 118 is real time or substantially in real time as financial transactions are recognized by the computers 122, 126, 130. The financial transaction data 210 may also be acquired manually by a user, for example, requesting updated financial transaction data 210 from one or more financial service providers 110, 112, 114.

FIG. 3 illustrates how a fraud detection analyzer 220 associated with the FMS 100 analyzes the aggregated financial data 120 for suspicious financial activity. FIG. 3 illustrates exemplary aggregated financial data 120 obtained from a system as illustrated in FIG. 2. The aggregated financial data 120 may include a number of categories of data types for each transaction. For example, the aggregated financial data 120 may include a financial service provider ID 222, merchant ID 224, transaction amount 226, account number 228, transaction type 230, transaction date 232, transaction time 234, geographic location of transaction 236, as well as other information. This list is meant to be illustrative and not exclusive as additional information (or less information) maybe included in the aggregated financial data 120. For example, transaction type 230 may include or be separated into another category the specific nature of the goods or services purchased at the merchant. The information that populates the various fields of the aggregated financial data 120 may originate directly from the various financial service providers 110, 112, 114. For example, the data may be transmitted using a known format such as QIF, OFX, or QFX. Alternatively, the data may be obtained, as explained herein, using web scraping, screen scraping, APIs, and the like. XML coding may be used to identify the particular data type that is being obtained by the FMS 100.

In other instances, a separate database 240 is used by the FMS 100 to acquire information that is populated within the aggregated financial data 120. For instance, the geographic location of a particular merchant 190, 192, 194 may not be present in the data obtained from the computers 122, 126, 130. The separate database 240 may, however, associate various merchant ID's 224 with a particular geographic location. In this case, the geographic location of the merchant can be retrieved from this separate database 240 and added to the aggregated financial data 120 as seen in FIG. 3. Geographic location data might also be obtained using the IP address associated with the particular merchant 190, 192, 194.

FIG. 3 illustrates a fraud detection analyzer 220 that analyzes the aggregated financial data 120 to detect potentially fraudulent transactions. FIG. 3 illustrates the three transactions that were described above in the context of FIG. 2 have been flagged by the fraud detection analyzer 220 as suspected fraudulent transactions. The aggregated financial data 120 of FIG. 3 illustrates these transactions as being flagged with flags 240. As described above, the fraud detection analyzer 220 permits these transactions to be identified as potentially fraudulent activity even though fraud detection software running on the financial service provider's computers 122, 126, 130 fail to identify these individual transactions as suspect. The fraud detection analyzer 220 is able to identify these transactions because financial data from multiple financial service providers is aggregated, whereby unusual purchasing or withdrawal patterns can be more easily spotted as they are occurring across accounts from different financial service providers.

In the particular example of FIGS. 2 and 3, assume, for example, that a user's pocketbook or purse has been stolen without the user's knowledge. The pocketbook or purse contains three transaction cards 200, 202, 204 that are issued, respectively, by three different FSPs 110, 112, 114. While a stolen pocketbook or purse has been given this is only illustrative as there are many different ways in which identity theft is used to procure money or goods from another person. Additional examples include mail theft, use of skimming devices, and the like. In this particular embodiment, only money-out transactions are contained in the aggregated financial data 120 since money-out transactions (as opposed to money-in transactions like deposits) are where fraud is most likely to occur. Here, the first several transactions that occur in late November are not flagged by the fraud detection analyzer 220. However, the three transactions on December $4^{th}$ contain flags 240 as the fraud detection analyzer 220 had identified these transactions as likely to be fraudulent. In this example, the fraud detection analyzer 220 has identified that transaction cards 200, 202, 204 are likely to be "hot" or stolen. The fraud detection analyzer 220 can use any number of detection schemes to identify potential fraudulent transactions. One method of detecting potential fraudulent activity includes measuring the velocity of money outflow from multiple accounts. Here, significant dollar purchases were made over a short period of time (e.g., several thousand dollars over a half-hour time period). The fraud detection analyzer 200 may thus analyze multiple accounts for money outflows that exceed a certain pre-defined threshold over a period of time (e.g., more than $1,000 in money-out transactions over a three-hour period of time or within a given day). The pre-defined threshold may be lowered or raised in accordance with a particular user's historical spending patterns. Alternatively, the threshold may be set to different levels depending on the nature of scrutiny of purchases desired.

Another method of detecting fraudulent activity includes analyzing the geographic locations where transactions are taking place. In this example, the three transactions with flags 240 take place in three different geographical regions that are far away from one another (e.g., San Jose, Los Angeles, and Chicago) over a short period of time. The fact that three transactions occurred in locations that are relatively far away from one another in a short period of time suggest that fraudulent activity has occurred. Again, in this embodiment, pre-determined geographic distances may be used as a threshold for flagging transactions as suspect. For example, this may include the number of miles between different merchants 190, 192, 194 or it may include the presence of one or more interstate transactions which may be suggestive of nefarious activity.

In another method of fraud detection, the fraud detection analyzer 120 may detect fraudulent activity based on the nature of the money outflows. For example, high-price electronic goods (e.g., televisions) were purchased from the first and second merchants 190, 192 in a short period of time. These merchants 190, 192 were identified as electronic retailers (R in FIG. 3). Here, substantially similar types of goods (e.g., high-value electronics gear) were purchased in a short window of time. This fact suggests that the transactions may be fraudulent. Moreover, shortly around this time period, an ATM transaction occurred at a third merchant 194 whereby the maximum amount of cash ($300.00) was withdrawn from an ATM. The presence of the ATM charge in close proximity in time with high-dollar electronic purchases can trigger the fraud detection analyzer 120 to flag these transactions as suspect.

In another method of fraud detection, the fraud detection analyzer 120 may detect fraudulent activity based on substantially similar transactions occurring across different financial service providers 110, 112, 114. For example, different transaction cards 200, 202, 204 may be used for similar transactions. For example, there could be three ATM withdrawal transactions spaced close apart in time (e.g., within two hours) from each card 200, 202, 204. In another example, there could be multiple purchases of similar goods using different transaction cards 200, 202, 204. For instance, the fraud detection analyzer 120 may flag the cards 200, 202, 204 as "hot" if they were each used to purchase $250 gift cards over a relatively short period of time. The fraud detection analyzer 120 can also be used to detect suspect transactions that do not even use a transaction card 200, 202, 204. For example, multiple transfers of money out of several different accounts over a short period of time may be flagged by the fraud detection analyzer 120. Likewise, transfers of money out of an account to a single common account or International-based account may be flagged by the fraud detection analyzer 120.

It should be understood that the fraud detection analyzer 120 may rely on some combination of these heuristics to identify fraudulent activity. Nor are these methods the exclusive methods of determining fraud. More sophisticated pattern recognition and artificial intelligence running on the fraud detection analyzer 120 can be used.

FIGS. 4A-4C illustrate a process of notification that may be included as part of the FMS 100. Here, after the fraud detection analyzer 120 has detected suspect or potentially fraudulent transactions, a notification 250 is sent out to the user or account holder 150. The notification 250 may be sent to a mobile communication device 154 that is associated with the user or account holder 150. The notification 250 may also be sent to a computer 152 that is used to access host computer 102. In the case of the embodiment of FIG. 1B, a notification 250 can be directly presented to the user of the computer 160. The notification 250 may take a number of different forms. For example, the notification 250 may include a text (SMS) message like that illustrated in FIG. 4B. Alternatively, the notification 250 may include a prompt that is displayed to the user on a display 103 that is associated with a computer 152, 160. The notification 250 may also include an e-mail communication or an automated phone call. Still referring to FIG. 4A, separately or in combination with the notification 250, one or more of the affected financial service providers 110, 112, 114 may be sent separate notifications 252. These notifications 252 may be specifically tailored to account that is provided or serviced by the particular FSP. The notifications 252 may also take a number of forms or formats. These include electronic and telephonic notifications that can be automatically sent via the computer 102, 160. Alternatively, written notifications can automatically be produced and mailed to the respective fraud departments of the affected financial service providers 110, 112, 114. Contact may also automatically be made with one or more credit bureaus (e.g., EXPERIAN, EQUIFAX, TRANSUNION credit bureaus) that identify that identity theft may have occurred for a particular user. EXPERIAN is a registered trademark of Experian Information Solutions, Inc., Costa Mesa, Calif., EQUIFAX is a registered trademark of Equifax Inc., Atlanta, Ga. and TRANSUNION is a registered trademark of TransUnion LLC, Chicago, Ill. The notifications 252 provided to the affected financial service providers 110, 112, 114 may be used to disable or lock the suspect accounts so that additional money cannot be taken from the account.

Figure 5:
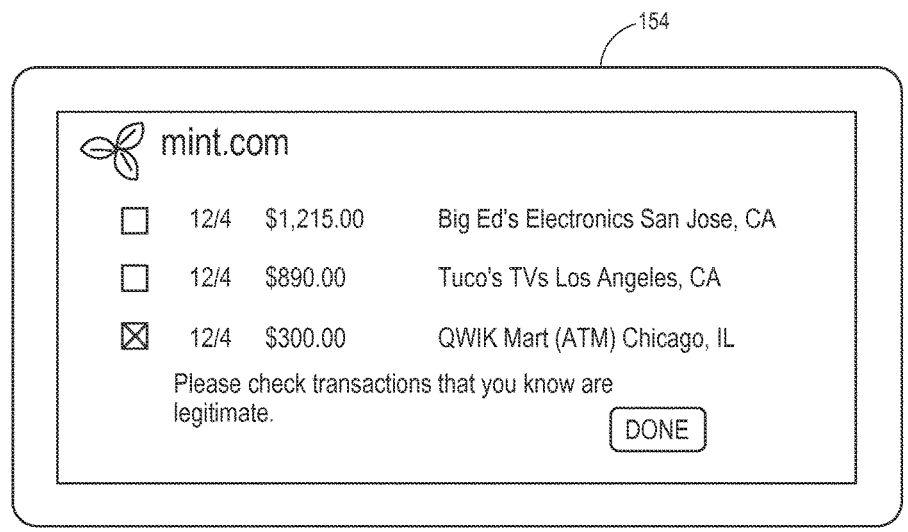
FIG. 5 illustrates a screen shot of a mobile communication device provide a user with additional detail regarding suspected fraudulent transactions identify by the fraud detection analyzer.

FIG. 5 illustrates an aspect of the system and method whereby the user is presented with additional details regarding the transactions with flags 240. For example, these transactions may be presented to the user using a button, hyperlink or the like that is present in the notification 250. FIG. 5 illustrates the three suspect transactions with details presented to the user. The user is given the option to check or click those transactions that are known to be legitimate. In this regard, the user is given the option to confirm whether certain transactions occurred. This option can be used, for example, prior to any notification 252 being sent to the affected financial service providers 110, 112, 114. For example, in this example, the user may indicate that the $300.00 ATM transaction in Chicago, Ill. was legitimate while the remaining two were not. In this scenario, notifications 252 would only then be sent to financial service providers 110, 112.

Figure 6:
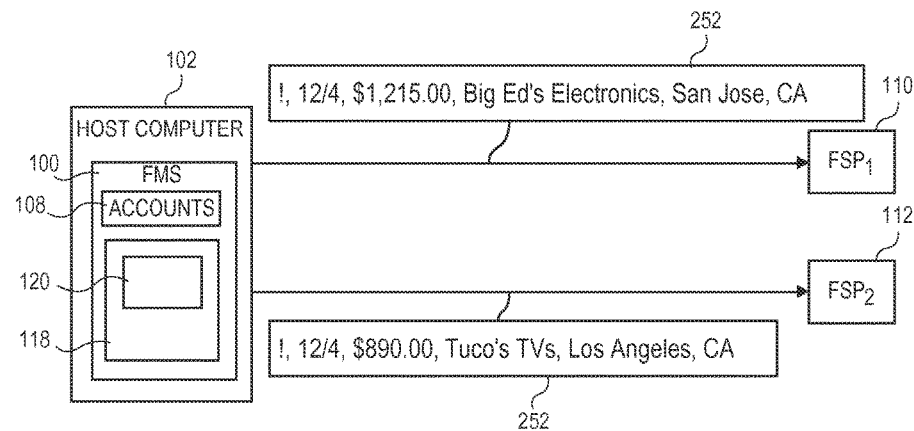
FIG. 6 illustrates a process of notifying affected financial service providers with details regarding the suspected fraudulent transactions.

FIG. 6 illustrates how the two financial service providers 110, 112 are then notified with respective notifications 252 about suspected fraudulent transactions. As seen in FIG. 6, details regarding each suspected fraudulent transaction at each financial service provider 110, 112 are contained in the notifications 252. In one embodiment, the details may be embedded within a header, packet, or the like that can be automatically read by computers 122, 126 associated with each financial service provider 110, 112. In this manner, it is possible that computers 122, 126 at each financial institution can automatically put a hold or stop to additional transactions conducted using transaction cards 200, 202. In this particular example, there is no human involvement between getting the notification 252 and shutting down the suspected "hot" card 200, 202. This is advantageous because once suspected fraudulent activity is suspected, this is quickly communicated to the affected financial service provider 110, 112 and actions are automatically taken at their end without any need to call a customer service representative or the like.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Further, it will be understood that embodiments can be implemented using various types of computing or mobile communication devices. Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method of detecting suspected financial fraudulent activity comprising:
a computing device running a personal financial management system configured to receive financial data for financial transactions for financial accounts of a common user at a plurality of different financial service providers;
the personal financial management system running on the computing device aggregating the received financial data for the common user;
the personal financial management system running on the computing device analyzing the aggregated financial data from the common user for suspicious financial activity by comparing the financial data for a financial transaction for a financial account at one of the financial service providers with financial data for one or more financial transactions for one or more other financial accounts at one or more different ones of the financial service providers in order to detect suspicious financial activity regarding one or more of the financial transactions according to one or more of the following criteria: respective geographic locations of the financial transactions being compared are in different geographic regions; respective types of purchased goods of the financial transactions being compared are similar types of goods; respective types of transaction of the financial transactions being compared are similar types of transaction; the financial transactions being compared occurred within a predetermined amount of time; value of the financial transactions being compared exceeds a value threshold; and velocity of money outflow for the financial transactions being compared exceeds an outflow threshold; wherein the financial transactions being compared are not determined to be suspicious by means other than the comparison; and
the personal financial management system running on the computing device notifying a user and at least one of the plurality of different financial service providers when suspicious financial activity is detected.

2. The computer-implemented method of claim 1, wherein the financial data from the plurality of different financial service providers is periodically received by the computing device running the personal financial management system.

3. The computer-implemented method of claim 1, wherein the financial data from the plurality of different financial service providers is automatically transmitted to the computing device running the personal financial management system.

4. The computer-implemented method of claim 1, wherein the criteria includes the financial transactions being compared occurred within a predetermined amount of time.

5. The computer-implemented method of claim 1, wherein the criteria includes respective geographic locations of the financial transactions being compared are in different geographic regions.

6. The computer-implemented method of claim 1, wherein the criteria includes respective types of transaction of the financial transactions being compared are similar types of transactions.

7. The computer-implemented method of claim 6, wherein similar types of transactions includes respective transactions being compared which are each cash withdrawals.

8. The computer-implemented method of claim 6, wherein similar types of transactions includes respective transactions being compared which are each money transfers.

9. The computer-implemented method of claim 6, wherein the criteria includes respective types of purchased goods of the financial transactions being compared are similar types of goods.

10. The computer-implemented method of claim 1, wherein the criteria includes the value of the financial transactions being compared exceeds a value threshold.

11. The computer-implemented method of claim 1, wherein the alert comprises an electronic communication.

12. The computer-implemented method of claim 11, wherein the alert comprises at least one of a prompt, e-mail, or text message.

13. The computer-implemented method of claim 1, wherein the computing device is remotely located from the user.

14. The computer-implemented method of claim 1, wherein the computing device comprises a personal computer or a mobile communication device.

15. A system for detecting suspected financial fraudulent activity comprising:
 a computing device running a personal financial management system configured to receive financial data for financial transactions for financial accounts of a common user at a plurality of different financial service providers;
 a database operably connected to the computing device running the personal financial management system and configured to contain aggregated financial data for the common user;
 a fraud detection analyzer in the personal financial management system executable by the computing device, the fraud detection analyzer configured to analyze the aggregated financial data from the common user for suspicious financial activity by comparing the financial data for a financial transaction for a financial account at one of the financial service providers with financial data for one or more financial transactions for one or more other financial accounts at one or more different ones of the financial service providers in order to detect suspicious financial activity regarding one or more of the financial transactions according to one or more of the following criteria: respective geographic locations of the financial transactions being compared are in different geographic regions; respective types of purchased goods of the financial transactions being compared are similar types of goods; respective types of transaction of the financial transactions being compared are similar types of transaction; the financial transactions being compared occurred within a predetermined amount of time; value of the financial transactions being compared exceeds a value threshold; and velocity of money outflow for the financial transactions being compared exceeds an outflow threshold over a period of time; wherein the financial transactions being compared are not determined to be suspicious by means other than the comparison; and
 wherein the computing device running the personal financial management system is configured to alert at least a user and at least one of the plurality of different financial service providers when suspicious financial activity is detected.

16. The system of claim 15, wherein the criteria includes velocity of money outflow for the financial transactions being compared exceeds an outflow threshold over a period of time.

17. The system of claim 15, wherein the database is remotely located from the computing device.

18. The system of claim 15, wherein the database is local with the computing device.

19. The system of claim 15, wherein the suspicious financial activity comprises transactions occurring across different financial service providers within a threshold time period.

20. The system of claim 15, wherein the criteria includes respective geographic locations of the financial transactions being compared are in different geographic regions.

21. The system of claim 15, wherein the criteria includes respective types of transaction of the financial transactions being compared are similar types of transactions.

22. The system of claim 15, wherein similar types of transactions includes respective transactions being compared which are each cash withdrawals.

23. The system of claim 15, wherein similar types of transactions includes respective transactions being compared which are each money transfers.

24. The system of claim 15, wherein the criteria includes respective types of purchased goods of the financial transactions being compared are similar types of goods.

25. The system of claim 15, wherein the criteria includes the value of the financial transactions being compared exceeds a value threshold.

* * * * *